(12) United States Patent
Ryuzaki et al.

(10) Patent No.: US 10,937,334 B2
(45) Date of Patent: Mar. 2, 2021

(54) INFORMATION PROVIDING SYSTEM

(71) Applicant: HONDA MOTOR CO., LTD., Tokyo (JP)

(72) Inventors: Tatsuya Ryuzaki, Wako (JP); Atsushi Kusuda, Wako (JP); Takayuki Haramoto, Wako (JP); Shimpei Shikanai, Wako (JP); Chikashi Takiguchi, Wako (JP); Motoshi Kyoden, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 293 days.

(21) Appl. No.: 15/863,302

(22) Filed: Jan. 5, 2018

(65) Prior Publication Data

US 2018/0218639 A1 Aug. 2, 2018

(30) Foreign Application Priority Data

Jan. 31, 2017 (JP) .............................. JP2017-016324

(51) Int. Cl.
*G09B 19/16* (2006.01)
*G10L 15/22* (2006.01)
(Continued)

(52) U.S. Cl.
CPC ............ *G09B 19/167* (2013.01); *G10L 13/00* (2013.01); *G10L 13/033* (2013.01); *G10L 15/22* (2013.01);
(Continued)

(58) Field of Classification Search
CPC ............ A63B 24/0075; A63B 71/0619; G09B 19/167; G09B 5/04; G09B 19/14;
(Continued)

(56) References Cited

U.S. PATENT DOCUMENTS 4,543,957 A * 10/1985 Friedman ............. A61B 5/0484
600/300
4,802,484 A * 2/1989 Friedman ............. A61B 5/0484
600/300

(Continued)

FOREIGN PATENT DOCUMENTS

DE 60124937 T2 9/2007
DE 102017000249 A1 7/2017
(Continued)

OTHER PUBLICATIONS

Japanese Office Action, dated Dec. 4, 2018 for Japanese Application No. 2017-016324, with an English translation.

(Continued)

*Primary Examiner* — Malina D. Blaise
(74) *Attorney, Agent, or Firm* — Birch, Stewart, Kolasch & Birch, LLP

(57) ABSTRACT

Enabling information provision of appropriate driving coaching and so forth in line with a user as a driver. A terminal device includes a driving information acquiring unit and a biological information acquiring unit functioning as an information acquiring unit that acquires information relating to the emotion, the driving skill, and the physical condition of a rider (user). Furthermore, an arithmetic unit of a server functions as an estimating unit that estimates the emotion, the driving skill, and the physical condition according to acquired information and functions as an information processing unit that carries out information provision to a rider according to the combination of the emotion, the driving skill, and the physical condition that are estimated.

11 Claims, 7 Drawing Sheets

(51) Int. Cl.
*G10L 13/033* (2013.01)
*G10L 13/00* (2006.01)
*G10L 25/63* (2013.01)
*G09B 5/04* (2006.01)
*G09B 19/14* (2006.01)
*G06N 20/00* (2019.01)

(52) U.S. Cl.
CPC ............... *G06N 20/00* (2019.01); *G09B 5/04* (2013.01); *G09B 19/14* (2013.01); *G10L 25/63* (2013.01); *G10L 2015/227* (2013.01); *G10L 2015/228* (2013.01)

(58) Field of Classification Search
CPC ....... G10L 13/00; G10L 13/033; G10L 15/22; G10L 25/63; G10L 2015/227; G10L 2015/228; G06N 20/00
See application file for complete search history.

(56) References Cited

U.S. PATENT DOCUMENTS

| | | | |
|---|---|---|---|
| 2002/0091473 A1 | 7/2002 | Gardner et al. | |
| 2006/0011399 A1* | 1/2006 | Brockway | B60T 17/18 180/272 |
| 2007/0290867 A1* | 12/2007 | Kuramori | B60Q 9/00 340/576 |
| 2009/0326814 A1* | 12/2009 | Harumoto | G01C 21/3655 701/414 |
| 2010/0134302 A1* | 6/2010 | Ahn | A61B 5/18 340/576 |
| 2011/0091847 A1* | 4/2011 | Carroll | G09B 19/00 434/236 |
| 2012/0150430 A1* | 6/2012 | French | G01C 21/3415 701/425 |
| 2014/0272810 A1* | 9/2014 | Fields | G01C 21/3676 434/65 |
| 2014/0309863 A1* | 10/2014 | Ricci | H04W 36/34 701/36 |
| 2014/0309933 A1* | 10/2014 | Shin | G01C 21/3484 701/533 |
| 2015/0260531 A1* | 9/2015 | Ehsani | G01C 21/3461 701/538 |
| 2016/0084661 A1* | 3/2016 | Gautama | G01C 21/365 701/400 |
| 2016/0176412 A1* | 6/2016 | Gunaratne | B60W 10/10 701/23 |
| 2016/0216130 A1* | 7/2016 | Abramson | G01C 21/3423 |
| 2016/0247394 A1* | 8/2016 | Stenneth | G07C 5/008 |
| 2016/0297478 A1* | 10/2016 | Inoue | B60T 8/246 |
| 2017/0080856 A1* | 3/2017 | Enomoto | A61B 5/18 |
| 2017/0083757 A1* | 3/2017 | Enomoto | G06F 3/011 |
| 2017/0202501 A1 | 7/2017 | Kuwahara et al. | |
| 2017/0262770 A1* | 9/2017 | Purdy | G06N 20/20 |
| 2017/0370732 A1* | 12/2017 | Bender | G01C 21/3492 |
| 2018/0001899 A1* | 1/2018 | Shenoy | B60W 40/08 |
| 2018/0086347 A1* | 3/2018 | Shaikh | B60W 40/09 |
| 2018/0172464 A1* | 6/2018 | Sekizawa | G01C 21/3617 |
| 2018/0174457 A1* | 6/2018 | Taylor | G08G 1/096716 |
| 2018/0178807 A1* | 6/2018 | Murata | B60W 50/082 |
| 2018/0300816 A1* | 10/2018 | Perl | G06Q 40/08 |
| 2019/0276036 A1* | 9/2019 | Noguchi | H04W 4/40 |
| 2019/0300021 A1* | 10/2019 | Li | F16H 61/0248 |

FOREIGN PATENT DOCUMENTS

| | | |
|---|---|---|
| JP | 319872 A | 11/2005 |
| JP | 2006-232174 A | 9/2006 |
| JP | 2009-134496 A | 6/2009 |
| JP | 2009-146254 A | 7/2009 |
| JP | 2013-109447 A | 6/2013 |

OTHER PUBLICATIONS

German Office Action and Search Report for German Application No. 102018201234.2, dated Nov. 20, 2019, with an English translation.

* cited by examiner

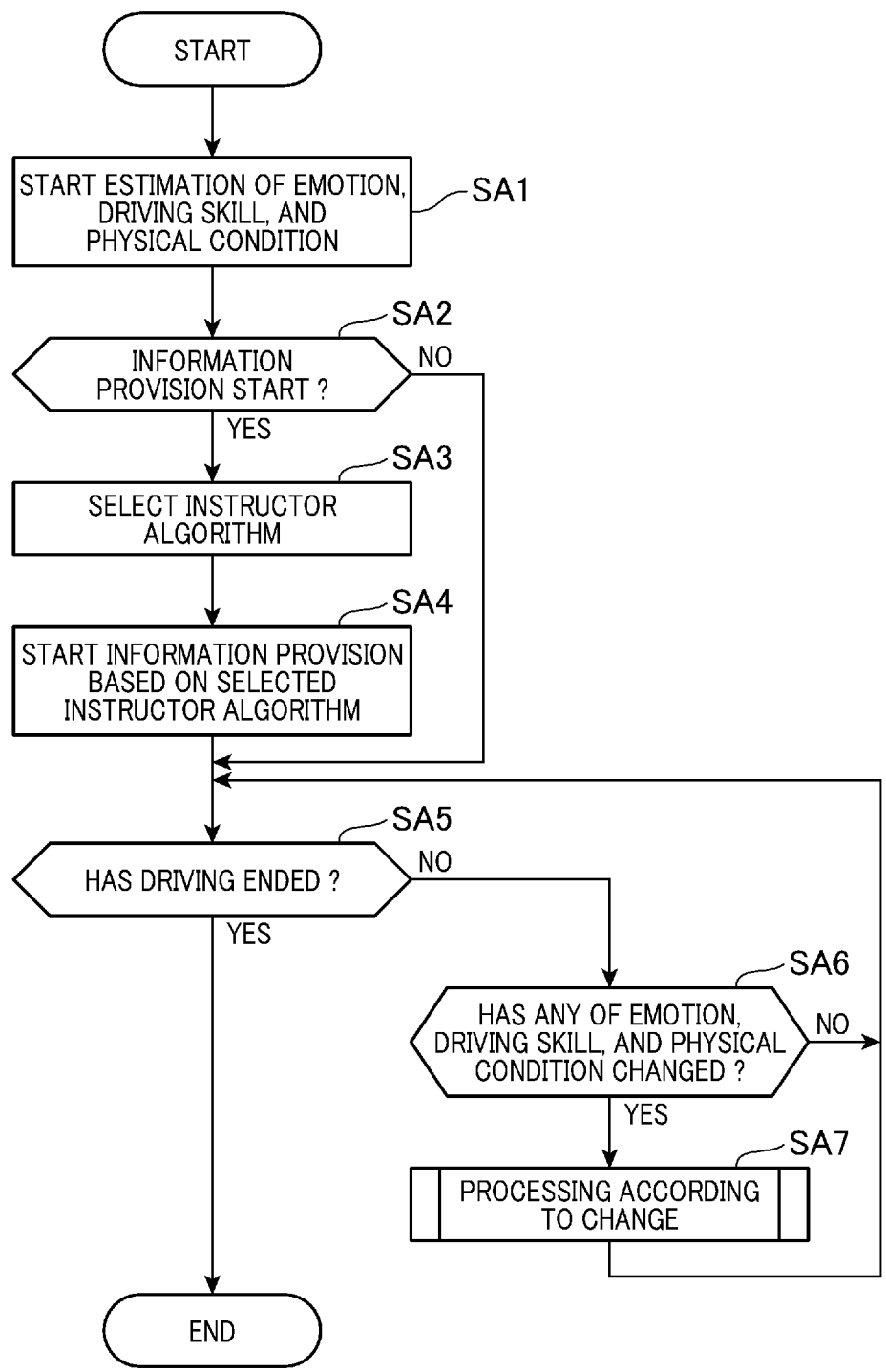

FIG.4

| EMOTION | DRIVING SKILL | PHYSICAL CONDITION |
|---|---|---|
| POSITIVE EMOTION | PUBLIC ROAD BEGINNER LEVEL | GOOD |
| POSITIVE EMOTION | PUBLIC ROAD INTERMEDIATE LEVEL | GOOD |
| POSITIVE EMOTION | PUBLIC ROAD ADVANCED LEVEL | GOOD |
| POSITIVE EMOTION | CIRCUIT BEGINNER LEVEL | GOOD |
| POSITIVE EMOTION | CIRCUIT INTERMEDIATE LEVEL | GOOD |
| POSITIVE EMOTION | CIRCUIT ADVANCED LEVEL | GOOD |
| POSITIVE EMOTION | CLOSE BEGINNER LEVEL | GOOD |
| POSITIVE EMOTION | CLOSE INTERMEDIATE LEVEL | GOOD |
| POSITIVE EMOTION | CLOSE ADVANCED LEVEL | GOOD |
| POSITIVE EMOTION | DRIVING SCHOOL BEGINNER LEVEL | GOOD |
| POSITIVE EMOTION | DRIVING SCHOOL ADVANCED LEVEL | GOOD |

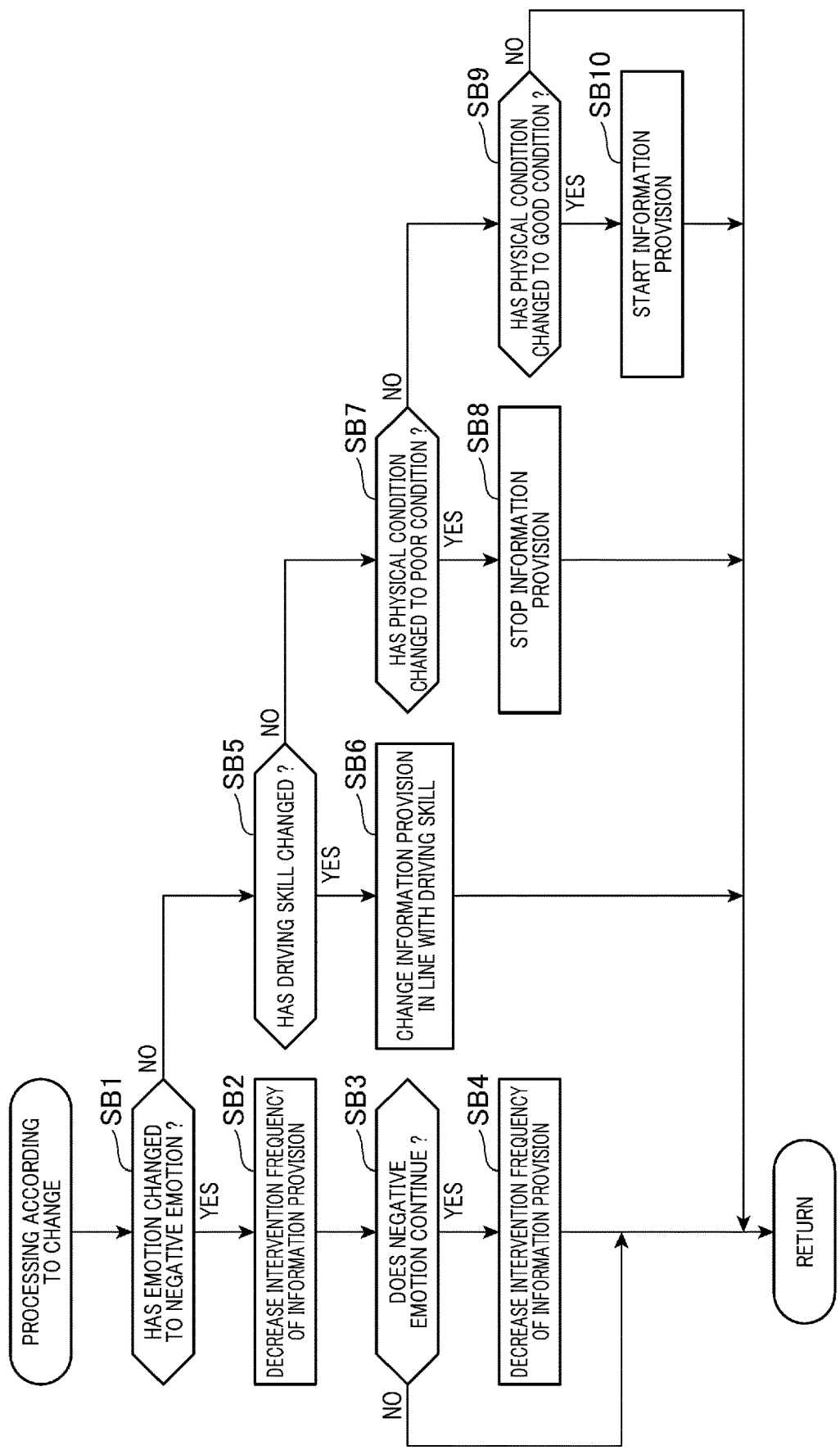

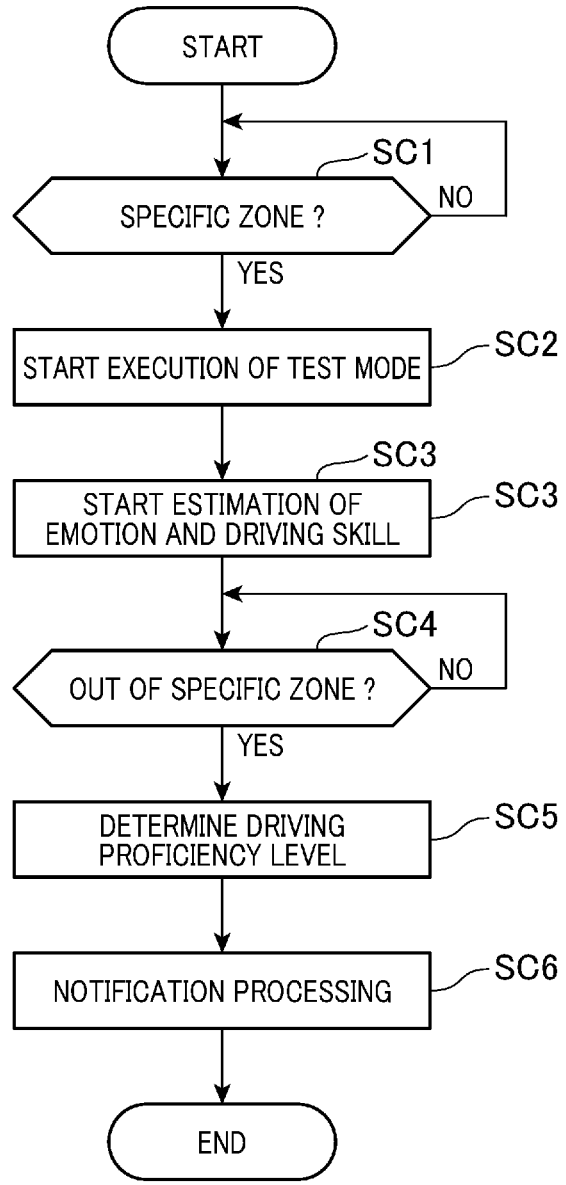

INFORMATION PROVIDING SYSTEM

INCORPORATION BY REFERENCE

The present application claims priority under 35 U.S.C. § 119 to Japanese Patent Application No. 2017-016324 filed on Jan. 31, 2017. The content of the application is incorporated herein by reference in its entirety.

TECHNICAL FIELD

The present invention relates to an information providing system.

BACKGROUND ART

A device that determines the skill of a driver is known. Regarding this kind of device, a technique has been disclosed in which it is determined that there is a need to support driving operation if even one of driving ability relating to steering operation, driving ability relating to accelerator operation, driving ability relating to brake operation, and driving ability relating to turn signal operation is equal to or lower than a reference value (for example, refer to Patent Document 1).

Furthermore, regarding this kind of device, a technique has also been disclosed in which the driving ability of a driver and the degree of confidence in the driving ability based on subjective evaluation by the driver are determined and driving assistance information is provided based on the driving ability and the degree of confidence that are determined (for example, refer to Patent Document 2).

PRIOR ART DOCUMENT

Patent Documents

[Patent Document 1]
Japanese Patent Laid-Open No. 2005-319872
[Patent Document 2]
Japanese Patent Laid-Open No. 2009-134496

SUMMARY OF THE INVENTION

Problems to be Solved by the Invention

Incidentally, the inventors consider that, if driving coaching with appropriate advice and so forth can be carried out in line with the driver, this is advantageous in improvement in the skill of driving and contributes to a sense of achievement and pleasure of the driver.

However, with a conventional configuration, it is impossible to carry out appropriate driving coaching in some cases. For example, it is conceivable that driving operation is supported or driving assistance is carried out also when the driver does not desire driving coaching or is in poor physical condition.

Therefore, the present invention aims at enabling information provision of appropriate driving coaching and so forth in line with the emotion and so forth of a user as a driver.

Means for Solving the Problems

To achieve the above-described object, an information providing system of an aspect of the present invention includes an information acquiring unit (18, 19) that acquires information relating to emotion, driving skill, and physical condition of a user, an estimating unit (33) that estimates the emotion, the driving skill, and the physical condition according to acquired information, and an information providing unit (33) that carries out information provision to the user who is driving a vehicle according to a combination of the emotion, the driving skill, and the physical condition that are estimated.

In the above-described configuration, the information providing unit (33) may change the information provision if any of the emotion, the driving skill, and the physical condition that are estimated from the user who is driving changes.

Furthermore, in the above-described configuration, the information providing unit (33) may reduce the frequency of the information provision if the estimated emotion changes from a positive emotion to a negative emotion.

Moreover, in the above-described configuration, a configuration may be employed in which the information providing unit (33) does not carry out the information provision if the estimated physical condition is poor.

In addition, in the above-described configuration, the information provision may include a dialogue-type instruction that imitates an instructor who carries out driving coaching, and change may be made to a dialogue-type instruction that imitates a different instructor according to change in any of the emotion, the driving skill, and the physical condition that are estimated.

Furthermore, in the above-described configuration, the information providing system may have an automatic mode in which change is made to a dialogue-type instruction that imitates a different instructor according to change in any of the emotion, the driving skill, and the physical condition that are estimated and a manual mode in which change is made to a dialogue-type instruction that imitates a different instructor according to selection by the user, and the information providing unit (33) may carry out control according to a selected mode.

Moreover, in the above-described configuration, the information providing system may have a proficiency level determining unit (33) that determines a driving proficiency level of the user based on at least the emotion and the driving skill that are estimated from the user who is driving, and, if the estimated emotion corresponds to a negative emotion although the estimated driving skill satisfies a predetermined level, the proficiency level determining unit (33) may determine the driving proficiency level as a driving proficiency level that does not reach the predetermined level.

In addition, in the above-described configuration, the driving skill may be estimated based on at least any of a driving history of the user, vehicle information, and environmental information on surroundings.

Furthermore, an information providing system of an aspect of the present invention has the following configuration. The information providing system has an information acquiring unit (18, 19) that acquires information relating to emotion and driving skill of a user, an estimating unit (33) that estimates the emotion and the driving skill according to acquired information, and a proficiency level determining unit (33) that determines a driving proficiency level of the user based on at least the emotion and the driving skill that are estimated from the user who is driving. If at least the estimated emotion corresponds to a negative emotion although the estimated driving skill satisfies a predetermined level, the proficiency level determining unit (33) determines the driving proficiency level as a driving proficiency level that does not reach the predetermined level.

Moreover, in the above-described configuration, the proficiency level determining unit (33) may execute processing of determining the driving proficiency level of the user in association with a vehicle and notifying the user of a determination result.

In addition, in the above-described configuration, the information providing system may have a test mode in which the driving proficiency level is measured, and the proficiency level determining unit (33) may automatically execute the test mode while a vehicle travels in a specific zone.

Effects of the Invention

In the aspect of the present invention, the information providing system includes the information acquiring unit that acquires information relating to the emotion, the driving skill, and the physical condition of a user, the estimating unit that estimates the emotion, the driving skill, and the physical condition according to acquired information, and the information providing unit that carries out the information provision to the user who is driving a vehicle according to the combination of the emotion, the driving skill, and the physical condition that are estimated. This allows appropriate information provision in line with the emotion and so forth of the user as a driver.

Furthermore, the information providing unit changes the information provision if any of the emotion, the driving skill, and the physical condition that are estimated from the user who is driving changes. Due to this, correction to appropriate information provision in line with the change in the emotion, the driving skill, and the physical condition of the user is facilitated.

Moreover, because the information providing unit reduces the frequency of the information provision if the estimated emotion changes from a positive emotion to a negative emotion, responding in line with the user who feels that the frequency of information provision is too high is enabled.

In addition, because the information providing unit does not carry out the information provision if the estimated physical condition is poor, responding in line with the user who is not in such a physical condition as to permit the information provision is enabled.

Furthermore, the information provision includes a dialogue-type instruction that imitates an instructor who carries out driving coaching, and change is made to a dialogue-type instruction that imitates a different instructor according to change in any of the emotion, the driving skill, and the physical condition that are estimated. This allows the user to get driving coaching similar to driving coaching with a dialogue with an instructor.

Moreover, the information providing system has the automatic mode in which change is made to a dialogue-type instruction that imitates a different instructor according to change in any of the emotion, the driving skill, and the physical condition that are estimated and the manual mode in which change is made to a dialogue-type instruction that imitates a different instructor according to selection by the user, and the information providing unit carries out control according to the selected mode. This enables instruction setting desired by the user.

In addition, the information providing system has the proficiency level determining unit that determines the driving proficiency level of the user based on at least the emotion and the driving skill that are estimated from the user who is driving. Furthermore, if the estimated emotion corresponds to a negative emotion although the estimated driving skill satisfies a predetermined level, the proficiency level determining unit determines the driving proficiency level as a driving proficiency level that does not reach the predetermined level. This can avoid the situation in which it is determined that the driving proficiency level is high although the user has no confidence in driving or is anxious, for example. This facilitates objective evaluation of the driving proficiency level and enables appropriate information provision in line with the user.

Furthermore, the driving skill is estimated based on at least any of the driving history of the user, the vehicle information, and the environmental information on the surroundings. Due to this, more accurate driving skill can be estimated.

Moreover, the aspect of the present invention has the information acquiring unit that acquires information relating to the emotion and the driving skill of a user, the estimating unit that estimates the emotion and the driving skill according to acquired information, and the proficiency level determining unit that determines the driving proficiency level of the user based on at least the emotion and the driving skill that are estimated from the user who is driving. If at least the estimated emotion corresponds to a negative emotion although the estimated driving skill satisfies a predetermined level, the proficiency level determining unit determines the driving proficiency level as a driving proficiency level that does not reach the predetermined level. This facilitates objective evaluation of the driving proficiency level and enables appropriate information provision in line with the user.

In addition, because the proficiency level determining unit executes the processing of determining the driving proficiency level of the user in association with the vehicle and notifying the user of a determination result, the user can get to know the objective driving proficiency level.

Furthermore, in the above-described configuration, the information providing system has the test mode in which the driving proficiency level is measured, and the proficiency level determining unit automatically executes the test mode while the vehicle travels in the specific zone. Due to this, the test mode can be surely executed in the specific zone and the driving proficiency level in the same specific zone can be surely measured, for example.

BRIEF DESCRIPTION OF THE DRAWINGS

FIG. 3 is flowchart illustrating the operation of the server when information provision is carried out.

FIG. 4 is a diagram illustrating conditions with which the information provision is started.

FIG. 5 is a flowchart illustrating processing of a step SA7 in FIG. 3.

FIG. 6 is a flowchart illustrating the operation of the server when execution of a test mode is selected.

MODE FOR CARRYING OUT THE INVENTION

An embodiment of the present invention will be described below with reference to the drawings.

Figure 1:
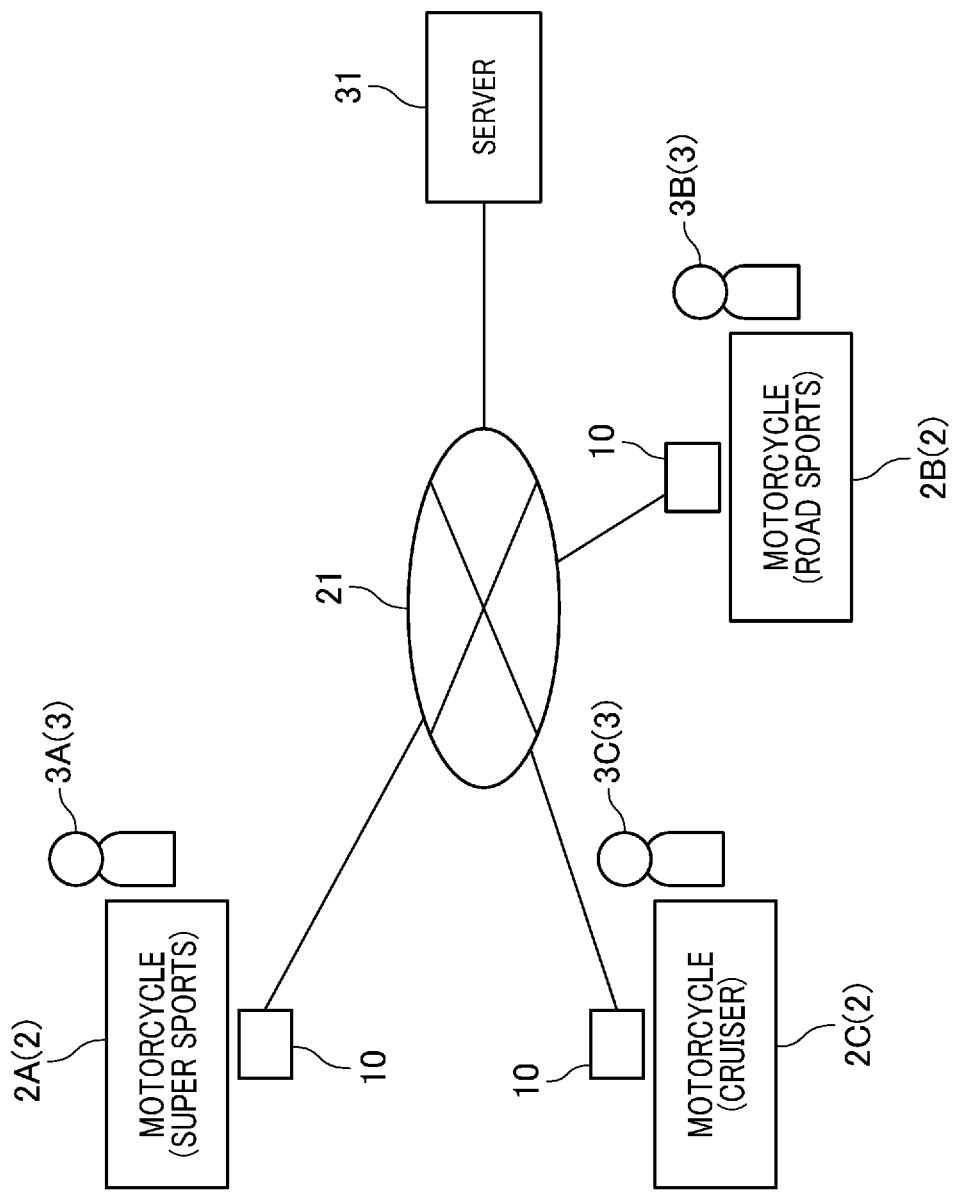
FIG. 1 is a diagram illustrating an information providing system according to an embodiment of the present invention.

FIG. 1 is a diagram illustrating an information providing system according to the embodiment of the present invention.

An information providing system 1 is a system that includes terminal devices 10 mounted on a respective one of motorcycles 2 and a server 31 that can communicate with the terminal devices 10 through a communication network 21, and carries out information provision to promote improvement in the skill of driving for riders 3 who drive the motorcycles 2.

It is also possible that this information providing system 1 is referred to as a driving coaching system that carries out driving coaching for the riders 3 as users of this system 1 or a driving skill improvement promoting system that improves the skill of driving of the riders 3.

Here, the driving coaching in the present embodiment means provision of information relating to driving directly or indirectly and includes also advice such as support of driving operation, driving assistance or the like.

In FIG. 1, as one example of the motorcycle 2, a motorcycle 2A categorized into super sports, a motorcycle 2B categorized into road sports, and a motorcycle 2C categorized into cruisers are illustrated. The riders 3 are riders 3A, 3B, and 3C who drive a respective one of the motorcycles 2A, 2B, and 2C. For example, the case in which the riders 3A, 3B, and 3C are the owners of a respective one of the motorcycles 2A, 2B, and 2C is conceivable. The riders 3A, 3B, and 3C may be persons who use the motorcycles 2A, 2B, and 2C only for a certain period. In the following description, if the motorcycles 2A, 2B, and 2C and the riders 3A, 3B, and 3C do not need to be explained with particular discrimination among them, they will be represented as the motorcycle 2 and the rider 3.

The communication network 21 is a wide-area communication network that can wirelessly communicate with the terminal device 10 while the motorcycle 2 is travelling in a predetermined area such as a public road, a circuit, a close course (referred to also as closed course) other than the circuit, or a driving school. The communication network 21 may be an open network such as the Internet or may be a closed communication network. If the communication network 21 is an open network, the terminal devices 10 and the server 31 may carry out secure communication on the communication network 21 by using Virtual Private Network (VPN) techniques and so forth. The network configuration and the communication protocol of the communication network 21 are not particularly limited.

The terminal devices 10 are devices having a first function of collecting information relating to the emotion, the driving skill, and the physical condition from the rider 3 who drives the motorcycle 2 and transmitting the information to the server 31 and a second function of carrying out various kinds of information provision to the rider 3 based on information received from the server 31.

Figure 2:
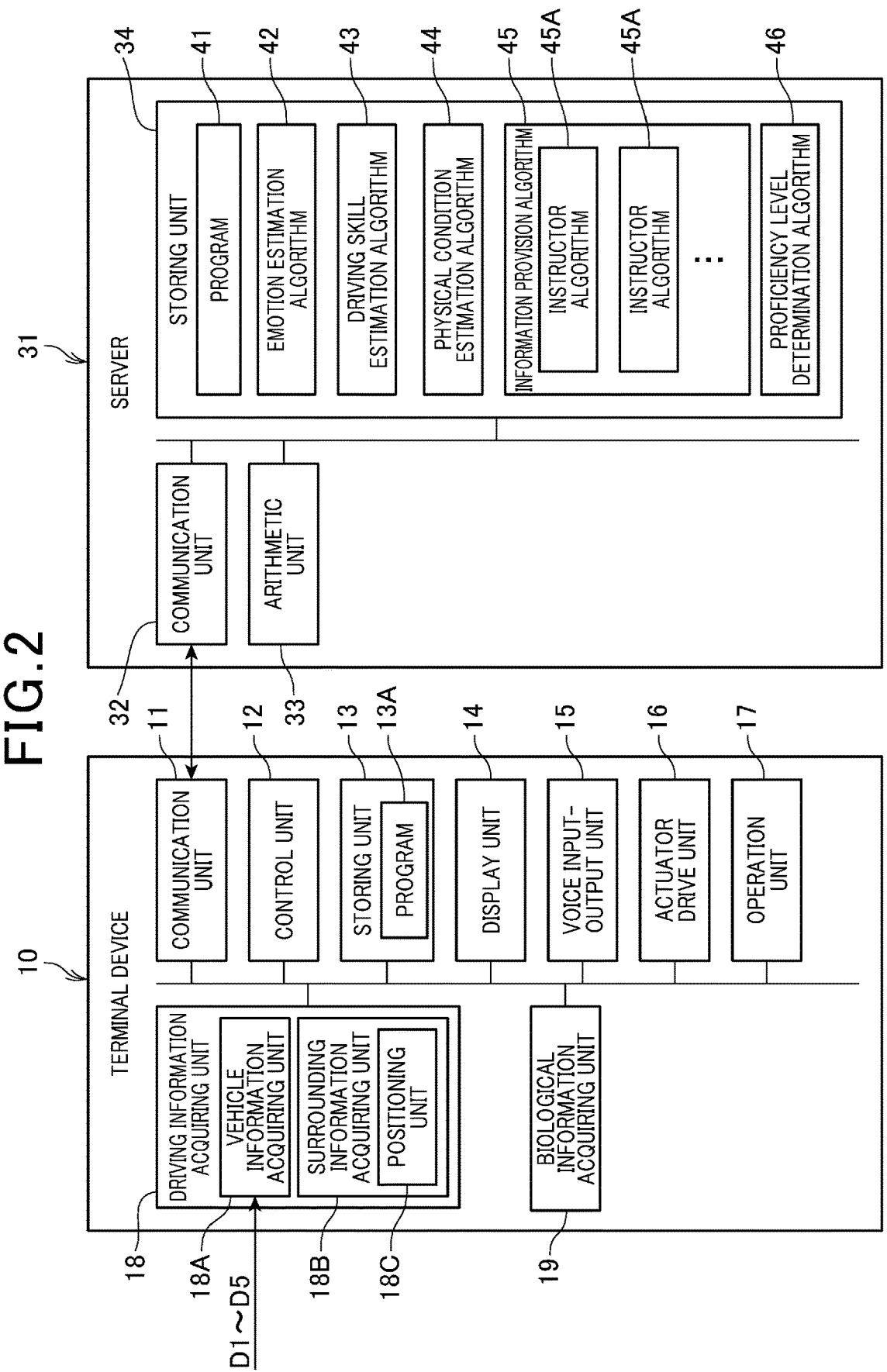
FIG. 2 is a block diagram illustrating the hardware configuration of a terminal device and a server.

FIG. 2 is a block diagram illustrating the hardware configuration of the terminal device 10 and the server 31.

The terminal device 10 includes a communication unit 11, a control unit 12, a storing unit 13, a display unit 14, a voice input-output unit 15, an actuator drive unit 16, an operation unit 17, a driving information acquiring unit 18, and biological information acquiring unit 19. The communication unit 11 communicates with the server 31 through the communication network 21 by executing communication processing in accordance with a wireless communication protocol under control by the control unit 12.

The control unit 12 functions as a computer unit that executes processing of implementing control of various units of the terminal device 10 and various kinds of functions by executing a program 13A stored in the storing unit 13 by a processor. This control unit 12 is composed of the processor and a peripheral circuit and is formed of a system-on-a-chip (SOC), for example.

The storing unit 13 stores the program 13A and data necessary for the terminal device 10 to execute various kinds of processing. As this storing unit 13, publicly-known storing devices can be widely applied. The data stored in the storing unit 13 includes identification information that enables identification of each of the terminal device 10, the motorcycle 2 on which this terminal device 10 is mounted, and the rider 3 who drives the motorcycle 2. By transmitting this identification information to the server 31, the terminal device 10, the motorcycle 2, and the rider 3 can be identified on the side of the server 31.

The display unit 14 notifies information to the rider 3 by displaying under control by the control unit 12. Furthermore, the voice input-output unit 15 notifies information to the rider 3 by voice under control by the control unit 12. Moreover, the actuator drive unit 16 notifies information to the rider 3 by driving an actuator that gives physical motion such as vibrations to the rider 3 under control by the control unit 12.

Due to this, the display unit 14, the voice input-output unit 15, and the actuator drive unit 16 function as information output units that output information to the rider 3 in different forms.

The information output to the rider 3 by these information output devices is information relating to driving of the motorcycle 2. More specifically, this information is information relating to accelerator operation (same as throttle operation), brake operation, gear shift operation (including clutch operation and shift pedal operation), cornering operation, operation of other operation systems such as a turn signal, and so forth. The cornering operation is posture change and so forth made by the rider 3 at the time of cornering.

For example, the display unit 14 includes plural LEDs associated with a respective one of these operations and allows the rider 3 to visually recognize whether or not each operation is appropriate by switching of lighting/non-lighting and so forth of each LED. Furthermore, the display unit 14 may be a display panel such as a liquid crystal panel or an organic electro-luminescence (EL) panel and enables a wide variety of information to be transmitted with use of an arbitrary image of characters, figures, and so forth by using these display panels. Moreover, as the display unit 14, a display device using augmented reality (AR) techniques may be used.

In the case of notifying the rider 3 of information in travelling, it is preferable to use the information output device with which the rider 3 can recognize the information in a short time, and LEDs or the like are more preferable than the display panel, for example.

The voice input-output unit 15 outputs voice such as synthetic voice from a speaker, which is not illustrated in the diagram, and collects voice of the rider 3 through a microphone, which is not illustrated in the diagram, under control by the control unit 12.

In the present embodiment, the configuration is so made that the respective units (control unit 12, voice input-output unit 15, display unit 14, and so forth) of the terminal device 10 and the server 31 operate in conjunction with each other and thereby a dialogue-type instruction can be output to the rider 3. Here, dialogical interaction includes a conversation (speech by use of a natural language to the counterpart and recognition of speech by the counterpart) and includes input and output of voice for implementing a conversation and so forth and mutual action such as input and output of characters or an image. The dialogical interaction will be abbreviated as "interaction" hereinafter.

More specifically, as output of the interaction, conversation voice or text responding to voice from the rider 3 is output. In addition, according to driving operation of the rider 3 obtained from a vehicle information acquiring unit 18A, conversation voice or text about whether or not the operation is appropriate is output and conversation voice or text of advice is output. This allows the rider 3 to make a dialogue by using the auditory sense or the visual sense.

The speaker and microphone are not limited to the configuration incorporated in the terminal device 10 and a configuration in which they are provided on the motorcycle 2, a configuration in which they are provided on a helmet worn by the rider 3, or the like can be applied. Furthermore, short-distance wireless communication by Bluetooth (registered trademark) or the like may be used for transmission and reception of signals between the speaker and microphone and the terminal device 10.

The actuator drive unit 16 drives the actuator that gives physical motion such as vibrations to the rider 3 and thereby transmits information to the rider 3 by using the tactile sense of the rider 3. The actuator is a vibrating device that vibrates the handlebar of the motorcycle 2, for example, and transmits the timing of accelerator operation, the timing of brake operation, the timing of gear shift operation, or the operation timing of another operation system by vibrations. By transmitting information by using the tactile sense of the hands of the rider 3, recognition of the information by the rider 3 is facilitated.

This physical motion may be employed as output of the interaction. A configuration in which the actuator drive unit 16 and the actuator are connected in a wired manner may be employed or a configuration in which information is allowed to be transmitted and received by using short-distance wireless communication may be employed.

The operation unit 17 includes an operation element that accepts various kinds of operation by the rider 3 or the like and outputs operation to the operation element to the control unit 12. As the operation element, plural hardware switches or a touch panel or the like can be applied. By this operation unit 17, identification information that allows the terminal device 10, the motorcycle 2, and the rider 3 to be identified can be set from the external or the rider 3 can select a desired instructor algorithm 45A among instructor algorithms 45A that imitate plural instructors, to be described later.

If the motorcycle 2 has configurations that can be used for the operation unit 17, the display unit 14, the voice input-output unit 15, and so forth, the terminal device 10 may use these configurations for the operation unit 17, the display unit 14, the voice input-output unit 15, and so forth.

The driving information acquiring unit 18 acquires information relating to driving of the motorcycle 2 (hereinafter, driving information) and outputs the acquired driving information to the control unit 12. This driving information is information necessary to determine the driving skill of the rider 3 and can be classified into vehicle information that indicates the status of the respective parts of the motorcycle 2 and surrounding information that indicates the surrounding situation of the motorcycle.

For this reason, the driving information acquiring unit 18 of the present embodiment includes the vehicle information acquiring unit 18A that acquires the vehicle information and a surrounding information acquiring unit 18B that acquires the surrounding information.

The vehicle information acquiring unit 18A acquires first vehicle information D1 relating to accelerator operation, second vehicle information D2 relating to brake operation, third vehicle information D3 relating to gear shift operation, fourth vehicle information D4 relating to cornering operation, and fifth vehicle information D5 relating to operation of other operation systems by acquiring information detected by various kinds of sensors the motorcycle 2 has. If it is impossible to obtain the above-described respective pieces of information D1 to D5 by only sensors the motorcycle 2 has normally, sensors may be provided in the terminal device 10 or the motorcycle 2 in order to obtain the information that cannot be obtained.

The first vehicle information D1 includes, as information relating to accelerator operation, not only mere information on accelerator operation, such as the degree of opening of the accelerator and the change amount thereof per unit time, but also information on the speed and the acceleration, such as the vehicle speed and the acceleration (deceleration) of the motorcycle 2. By the first vehicle information D1, accelerator operation according to the speed and the acceleration can be identified. Furthermore, if the motorcycle 2 has a traction control system (TCS), the first vehicle information D1 also includes information about whether or not the TCS has operated.

The second vehicle information D2 includes, as information relating to brake operation, not only operation information of brake operation elements (respective brake operation elements for the front wheel and for the rear wheel) but also information on the speed and the acceleration of the motorcycle 2. By the second vehicle information D2, brake operation according to the speed and the acceleration can be identified. Furthermore, if the motorcycle 2 has an antilock brake system (ABS), the second vehicle information D2 also includes information about whether or not the ABS has operated.

The third vehicle information D3 includes, as information relating to gear shift operation, information on the speed and the acceleration of the motorcycle 2 in addition to operation information of gear shift operation elements (clutch lever and shift pedal) and information on the gear shift stage. By the third vehicle information D3, gear shift operation according to the speed and the acceleration can be identified.

The fourth vehicle information D4 includes, as information relating to cornering operation, information on the position of the center of gravity of the motorcycle 2, which changes according to the posture of the rider 3 and so forth, in addition to the bank angle of the motorcycle 2. Information on the position of the center of gravity can be identified by using a publicly-known method such as calculating the position of the center of gravity from values from sensors that detect the roll angle (equivalent to the bank angle), the pitch angle, the yaw angle, and so forth of the motorcycle 2, for example. Whether or not cornering is stable can be evaluated based on the position of the center of gravity and the bank angle.

In the fourth vehicle information D4, information of detection of another operation carried out by the rider 3 at the time of cornering may be included. For example, information of detection of change in the load to the left and right pedals may be included. By the fourth vehicle information D4, cornering operation according to the bank angle and the movement of the center of gravity can be identified.

The fifth vehicle information D5 includes information about whether or not operation of an operation switch operated by the rider at the time of driving, such as a turn signal switch, is carried out as information relating to operation of other operation systems. By the fifth vehicle information D5, turn signal operation and so forth carried out the by the rider 3 can be identified.

The surrounding information acquiring unit 18B acquires information on the surroundings by a surrounding detection sensor provided in the motorcycle 2, the terminal device 10, or equipment of the rider 3 (helmet, clothing, or the like). The surrounding detection sensor is a device that senses the road situation, signs, vehicles in the surroundings, and so forth by using a sensing technique based on image processing or a device that detects the road situation, signs, vehicles and persons in the surroundings, the ambient temperature, and so forth by using sensing techniques based on radio waves, an infrared ray, a laser, or the like.

The surrounding information acquiring unit 18B acquires, as the information on the surroundings, information about whether or not the travelling path is a straight line, a right curve, a left curve, or a crossing, whether or not a signal exists, the color of the signal, a stop line, whether or not a crosswalk exists, the speed limit, whether or not a vehicle or person exists in the surroundings, the inter-vehicle distance, whether or not the present situation is a situation in which the motorcycle 2 easily slips (the road surface is wet, the ambient temperature is low, or the like), and so forth.

Furthermore, this surrounding information acquiring unit 18B has a positioning unit 18C that detects the present location by using a GPS system or the like and can notify the server 31 of the detected present location by the communication unit 11. Moreover, the surrounding information acquiring unit 18B may have map data in which information on travelling paths, signals, signs, and so forth is described, and acquire information on the surroundings, such as whether or not the present location is a crossing, by referring to the map data. Furthermore, the surrounding information acquiring unit 18B can also acquire information about whether or not the present location is a circuit, a close course in which travelling of vehicles such as the motorcycle 2 is permitted, or a driving school by referring to the map data.

The biological information acquiring unit 19 acquires biological information of the rider 3 by a biological sensor mounted in the motorcycle 2, the terminal device 10, or equipment of the rider 3 (helmet, clothing, or the like). As the biological sensor, a device using a sensing technique based on image processing or a publicly-known vital sensor is applied. The biological sensor detects biological information relating to the physical condition of the rider 3.

The biological information acquiring unit 19 acquires information on the pulse rate, the blood pressure, the facial expression, the amount of perspiration, and so forth, for example as the biological information relating to the physical condition of the rider 3. The pulse rate, the blood pressure, the facial expression, and the amount of perspiration can be detected by a pulse wave sensor, a pressure sensor, an image recognizing device, and a sensor that detects water or moisture of a palm of the rider 3, respectively.

Next, the server 31 will be described.

As illustrated in FIG. 2, the server 31 includes a communication unit 32, an arithmetic unit 33, and a storing unit 34. The communication unit 32 carries out communication with plural terminal devices 10 through the communication network 21 (FIG. 1) by executing communication processing in accordance with a wireless communication protocol under control by the arithmetic unit 33.

The arithmetic unit 33 has a processor having higher processing capability than the control unit 12 of the terminal device 10, and functions as a computer unit that executes processing of implementing control of various units of the server 31 and various kinds of functions by executing a program 41 stored in the storing unit 34.

This arithmetic unit 33 includes one or plural constituent elements that use artificial intelligence (AI) techniques and thereby functions as an artificial intelligence. Due to the functioning of the arithmetic unit 33 as the artificial intelligence, an estimation function of estimating the emotion, the driving skill, and the physical condition of each rider 3 based on information from each terminal device 10 and an information provision function of carrying out information provision relating to driving to each rider 3 according to the estimation result are implemented.

As the artificial intelligence techniques, for example, machine learning such as various kinds of filtering, independent component analysis, support vector machine (SVM), image processing techniques such as contour extraction, pattern recognition (for example, speech recognition, face recognition, and so forth), natural language processing, intelligent information processing, reinforcement learning, Bayesian network, self-organizing map (SOM), neural network, and deep learning, and so forth are used. Furthermore, the estimation, decision of information provision (including a response of an instruction), and so forth in the arithmetic unit 33 are carried out based on algorithms obtained in advance by the machine learning and so forth.

As the storing unit 34, publicly-known storing devices can be widely applied. The storing unit 34 stores the program necessary for the server 31 to execute various kinds of processing and data of algorithms and so forth used by the arithmetic unit 33.

As illustrated in FIG. 2, the server 31 has, as the algorithms, an emotion estimation algorithm 42 for estimating the emotion, a driving skill estimation algorithm 43 for estimating the driving skill, a physical condition estimation algorithm 44 for estimating the physical condition, and an information provision algorithm 45 for carrying out information provision.

The emotion estimation algorithm 42 is an algorithm that estimates the emotion based on acquired information of the voice input-output unit 15 and the biological information acquiring unit 19. In the case of estimating the emotion with only information from the voice input-output unit 15, if the rider 3 says that this driving is pleasant although feeling anxiety, it is detected that the emotion is pleasant erroneously. This emotion estimation algorithm 42 estimates the emotion in consideration of voice of the rider 3 (including a conversation) and pieces of biological information such as the pulse rate, the blood pressure, the facial expression, and the amount of perspiration by using also acquired information of the biological information acquiring unit 19. This makes it easier to carry out high-accuracy emotion estimation similar to determination by the person, and high-accuracy estimation can be carried out. Furthermore, due to use of artificial intelligence techniques, emotion estimation closer to that by the human is possible.

In the present embodiment, it is determined whether or not the emotion of the rider 3 is a negative emotion that is an emotion with a tendency toward rejection of driving coaching or a positive emotion that is an emotion with a tendency toward permission of driving coaching. The negative emotion is an emotion with fear, anxiety, anger, or disgust, for example, and can be referred to also as an unfavorable emotion. Furthermore, the positive emotion is an emotion with delight, fun, or a feeling of happiness, for example, and can be referred to also as a favorable emotion.

The driving skill estimation algorithm 43 is an algorithm that estimates the driving skill of the rider 3 based on acquired information of the driving information acquiring unit 18. More specifically, this algorithm estimates the driving skill based on the first to fifth vehicle information D1 to D5 (driving history) relating to accelerator operation, brake operation, gear shift operation, cornering operation, and operation of other operation systems and information on the surroundings (environmental information) such as the road situation (road surface).

That is, skill estimation is carried out by using information similar to that of an instructor who carries out driving coaching of the motorcycle 2 and high-accuracy estimation is enabled. Furthermore, due to use of artificial intelligence techniques, estimation closer to that by the human is possible.

This driving skill estimation algorithm 43 separately estimates the driving skill on the public road, the driving skill in a circuit, the driving skill in a close course (excluding the circuit), and the driving skill in a driving school. Specifically, this algorithm estimates the driving skill in accordance with public road rules when determining that the motorcycle 2 is travelling on the public road based on information on the surroundings, and estimates the driving skill in accordance with rules of a circuit when determining that the motorcycle 2 is travelling in the circuit based on information on the surroundings. Furthermore, the algorithm estimates the driving skill in accordance with rules of a close course when determining that the motorcycle 2 is travelling in the close course based on information on the surroundings, and estimates the driving skill in accordance with rules of a driving school when determining that the motorcycle 2 is travelling in the driving school based on information on the surroundings. This can estimate the driving skill in such a manner that travelling rules different among the public road, the circuit, the close course, and the driving school are employed as the criterion.

In the present embodiment, as illustrated in FIG. 4 to be described later, the driving skill on the public road is determined at three stages as follows. Specifically, the driving skill of the rider 3 unaccustomed to driving on the public road is determined as "public road beginner level," and the driving skill of the rider 3 who has moderately mastered driving on the public road is determined as "public road intermediate level," and the driving skill of the rider 3 who has mastered driving on the public road at a high level is determined as "public road advanced level." Furthermore, in the case of a circuit, the driving skill is determined as "circuit beginner level," "circuit intermediate level," and "circuit advanced level" sequentially from the driving skill of the most unaccustomed rider 3. Moreover, also regarding a close course, the driving skill is determined as "close beginner level," "close intermediate level," and "close advanced level" sequentially from the driving skill of the most unaccustomed rider 3. In addition, in the case of a driving school, the driving skill is determined at two stages of "driving school beginner level" and "driving school advanced level" sequentially from the driving skill of the most unaccustomed rider 3. In general, in skill training of a driving school, there are a first stage at which basic skills are taught and learned and a second stage at which higher skills than the first stage are taught and learned. For example, the driving skill corresponding to the first stage is determined as "driving school beginner level" and the driving skill corresponding to the second stage is determined as "driving school advanced level."

The physical condition estimation algorithm 44 is an algorithm that estimates the physical condition of the rider 3 based on acquired information of the biological information acquiring unit 19. This algorithm uses the same information as that used to determine the physical condition of a person by an expert such as a doctor, i.e. pieces of information such as the pulse rate, the blood pressure, the facial expression, and the amount of perspiration. This allows physical condition estimation similar to determination by an expert. Furthermore, because the artificial intelligence is used, physical condition estimation closer to that by the human is possible.

The information provision algorithm 45 has the instructor algorithms 45A that each imitate a respective one of plural instructors who carry out driving coaching of the motorcycle 2. The instructors imitated by the respective instructor algorithms 45A are different in the coaching target, the coaching method, the character, and so forth. For example, the coaching target is any one or more of "public road beginner level," "public road intermediate level," "public road advanced level," "circuit beginner level" to "circuit advanced level," "close beginner level" to "close advanced level," "driving school beginner level," and "driving school advanced level." The coaching method is gentle coaching or strict coaching, for example. The character is the personality, the sex, or the like, for example.

Each algorithm carries out appropriate estimation or information provision by using information used when a person carries out estimation (hereinafter, basic information). Thus, the basic information is also stored in the storing unit. For example, the information provision algorithm 45 stores, as the basic information, data regarding each of categories of the motorcycle 2 like those illustrated in FIG. 1, data regarding each vehicle model, public road rules, rules of circuits, rules of close courses, rules of driving schools, coaching data, and so forth and allows driving coaching similar to a person (instructor) by using these pieces of data.

Furthermore, in the present embodiment, the configuration is so made that the intervention frequency that is the frequency at which driving coaching is carried out when the instructor algorithm 45A is used can be varied by changing a predetermined parameter and so forth.

For example, driving coaching is carried out at each corner and at each crossing if the intervention frequency is increased, and the time interval of driving coaching can be extended by decreasing the intervention frequency. Furthermore, if the intervention frequency is decreased most, driving coaching is not carried out or driving coaching is carried out only in the case of a situation in which the degree of importance of driving coaching is high. The situation in which the degree of importance of driving coaching is high is a situation in which the inter-vehicle distance is excessively short or a situation in which the ABS operates, for example.

As illustrated in FIG. 2, the server 31 further has a proficiency level determination algorithm 46. The proficiency level determination algorithm 46 is an algorithm that determines the driving proficiency level of the rider 3. The driving proficiency level is what indicates a degree with which it can be determined that the driving skill of the rider 3 in the public road, a circuit, a close course, or a driving school is equal to or higher than a predetermined level. Furthermore, particularly in the case of the public road, the driving proficiency level is estimated to be higher when the intervention frequency of the TCS and the ABS is lower. Furthermore, in the case of a driving school, the driving skill is estimated based on whether or not each operation defined in skill training of the driving school is appropriate.

This algorithm 46 determines the driving proficiency level of the rider 3 in association with the motorcycle 2, i.e. determines the driving proficiency level regarding each of the combinations of the motorcycle 2 and the rider 3.

For example, the algorithm 46 executes processing of determining the driving proficiency level at multiple stages from a beginner level at which the rider 3 is unaccustomed to driving of the motorcycle 2 to a professional level at which the rider 3 is comparable to professionals in driving of the motorcycle 2 and notifying the rider 3 of the driving proficiency level. This allows the rider 3 to recognize the driving proficiency level of oneself with respect to the motorcycle 2.

In the present embodiment, the information providing system 1 has a test mode in which the driving proficiency level is measured. If a predetermined condition is satisfied, the server 31 executes the test mode, i.e. determines the driving proficiency level by the proficiency level determination algorithm 46.

In this case, the server 31 determines whether or not the predetermined condition with which the test mode is executed is satisfied by the arithmetic unit 33 based on acquired information of the surrounding information acquiring unit 18B, and executes the test mode if the condition is satisfied. The predetermined condition is that the present location is on a travelling route on which the rider 3 frequently travels, specifically, for example the present location is in a travelling area specified by the rider 3 in advance, such as a practice place, or is in a specific place such as a circuit, or the like.

Due to this, the arithmetic unit 33 functions also as an automatic executing unit that automatically executes the test mode while the motorcycle 2 is travelling in a specific zone. Therefore, the driving proficiency level in the specific zone can be measured and the rider 3 can easily get to know whether or not the skill of oneself has been improved from the driving proficiency level in the same specific zone. The rider 3 may be allowed to execute the test mode through manual operation.

When the motorcycle 2 is driven by the rider 3, this information providing system 1 automatically starts processing of estimating the emotion, the driving skill, and the physical condition of the rider 3 and carrying out information provision of driving coaching to the rider according to the estimation result. Furthermore, depending on the setting of the rider 3 and so forth, it is also possible that this processing is not started or the rider 3 selects the desired instructor algorithm 45A and causes the instructor algorithm 45A to be executed.

Next, operation in the case of carrying out information provision of driving coaching will be described.

FIG. 3 is a flowchart illustrating the operation of the server 31 when information provision is carried out.

As a premise, at least when driving of the motorcycles 2 is started by the riders 3, each terminal device 10 of the motorcycles 2 starts acquisition of biological information of the rider 3 by the biological information acquiring unit 19 and starts acquisition of vehicle information (first to fifth vehicle information D1 to D5) and information on the surroundings by the driving information acquiring unit 18 under control by the control unit 12. These pieces of information are transmitted to the server 31 by the communication unit 11 in real time under control by the control unit 12.

When detecting the start of driving by the respective riders 3 due to start of communication with the respective terminal devices 10, the server 31 starts reception of the biological information, the vehicle information, and the information on the surroundings regarding each rider 3 who is driving. In this case, the server 31 receives identification information of the motorcycles 2 and the riders 3 or address information unique to the terminal devices 10 (MAC address or the like) transmitted from the terminal devices 10, and identifies the combinations of the motorcycle 2 and the rider 3, the vehicle models of the motorcycles 2, and so forth by referring to a predetermined database. The processing executed by the server 31 with the respective terminal devices 10 is similar. Thus, the processing executed by the server 31 with one terminal device 10 will be described below.

When receiving the information from the terminal device 10, the server 31 starts estimation of the emotion, the driving skill, and the physical condition as illustrated in FIG. 3 (step SA1). In this case, the arithmetic unit 33 of the server 31 executes the emotion estimation algorithm 42, the driving skill estimation algorithm 43, and the physical condition estimation algorithm 44 and thereby estimates the emotion, the driving skill, and the physical condition of the present timing.

Next, the server 31 determines whether or not to start information provision (driving coaching) based on the combination of the estimation results of the emotion, the driving skill, and the physical condition by the arithmetic unit 33 (step SA2).

FIG. 4 is a diagram illustrating conditions (combinations of emotion, driving skill, and physical condition) with which information provision is started.

As illustrated in FIG. 4, the server 31 starts information provision if the emotion of the rider 3 is estimated to be a positive emotion (delight, fun) and the driving skill of the rider 3 is estimated and the physical condition of the rider 3 is estimated to be good. For this reason, in at least any case of the case in which the emotion is estimated to be a negative emotion (fear, anxiety, anger), the case in which the driving skill is not estimated, and the case in which the physical condition is estimated to be poor, the condition is not satisfied and the server 31 does not start information provision.

As illustrated in FIG. 3, the server 31 makes transition to processing of a step SA3 if the server 31 starts information provision, and makes transition to processing of a step SA5 if the server 31 does not start information provision.

If having transition to the processing of the step SA3, the server 31 selects the instructor algorithm 45A by the arithmetic unit 33. In this selection, the instructor algorithm 45A corresponding to at least the estimated driving skill is selected. For example, plural instructor algorithms 45A corresponding to the estimated driving skill are extracted and the instructor algorithm 45A is randomly selected among them in consideration of the conditions other than the driving skill.

Subsequently, the server 31 starts information provision by the arithmetic unit 33 based on the selected instructor algorithm 45A (step SA4). In this case, by executing the instructor algorithm 45A, the arithmetic unit 33 generates information on driving coaching based on acquired information of the driving information acquiring unit 18 continually transmitted from the terminal device 10 and transmits the information to the terminal device 10 by the communication unit 32.

Specifically, the server 31 outputs control information of the display unit 14 of the terminal device 10, control information of the voice input-output unit 15, and control information of the actuator drive unit 16 as the information on driving coaching.

The control information of the display unit 14 is information that causes the display unit 14 to display information on driving coaching and includes information that indicates the on-/off-state of an LED or information of text or an image to be displayed, for example. By this control information, to carry out driving coaching, the timing of accelerator operation, gear shift operation, brake operation, or the like can be notified by the LED or the like or information on text or an image serving as an interaction to the rider 3 can be notified.

Furthermore, the control information of the voice input-output unit 15 is information that causes the voice input-output unit 15 to output voice of driving coaching and includes a voice signal of synthetic voice or the like, for example. By this control information, voice of driving coaching or voice serving as an instruction to the rider 3 can be output.

Moreover, the control information of the actuator drive unit 16 is information that causes the actuator drive unit 16 to output physical motion of driving coaching and includes a signal or information that controls driving of the actuator, for example. By this control information, physical vibrations for driving coaching can be output.

In this manner, driving coaching is implemented for the rider 3 by displaying, voice, and vibrations. This driving coaching is carried out based on acquired information of the driving information acquiring unit 18 transmitted from the terminal device 10 in real time. Thus, driving coaching matched with the present driving situation can be implemented. For example, when the motorcycle 2 is headed toward a crossing, driving coaching of the crossing can be implemented. When the motorcycle 2 is intending to make a right turn, driving coaching of the right turn can be implemented.

As illustrated in FIG. 3, transition to processing of the step SA5 is made after the start of the information provision, and the server 31 determines whether or not the driving has ended. In this case, the server 31 determines that the driving has ended if information indicating the end of the driving is transmitted from the terminal device 10 or if information is not received from the terminal device 10 for a predetermined period continuously. If determining that the driving has ended (step SA5: YES), the server 31 ends the processing of information provision.

On the other hand, if the driving has not ended (step SA5: NO), the server 31 determines whether or not any of the emotion, the driving skill, and the physical condition has changed by the arithmetic unit 33 (step SA6). Specifically, the arithmetic unit 33 accumulates the estimation results of the emotion, the driving skill, and the physical condition in the storing unit 34 and compares the estimation results with past estimation results to thereby determine whether or not any of the emotion, the driving skill, and the physical condition has changed.

If determining that none of the emotion, the driving skill, and the physical condition has changed by the arithmetic unit 33 (step SA6: NO), the server 31 makes transition to the processing of the step SA5. On the other hand, if any of the emotion, the driving skill, and the physical condition has changed (step SA6: YES), the server 31 executes processing according to the change (step SA7).

The processing of the step SA7 is processing of making change to information provision or the like desired by the rider 3 by changing the frequency of information provision, stopping information provision, resuming information provision, or the like in line with the change in any of the emotion, the driving skill, and the physical condition.

FIG. 5 is a flowchart illustrating the processing of the step SA7 in FIG. 3 (processing according to change).

The server 31 determines whether or not the emotion has changed from a positive emotion to a negative emotion by the arithmetic unit 33 (step SB1). If the emotion has changed to a negative emotion (step SB1: YES), the server 31 decreases the intervention frequency of information provision (step SB2). Decreasing the intervention frequency of information provision is equivalent to reduction in the frequency of driving coaching. Thus, if the rider 3 has changed to the negative emotion due to excessively-high frequency of information provision, the rider 3 can be returned to a positive emotion.

If the negative emotion continues (step SB3), the server 31 further decreases the intervention frequency of information provision by the arithmetic unit 33 (step SB4). By further decreasing the intervention frequency, driving coaching is not carried out. Alternatively, driving coaching is carried out only when driving of the rider 3 is in a driving state that greatly deviates from a public road rule or a circuit rule or only in the case of a crisis state in which the safety of the motorcycle 2 is threatened. This can avoid the influence on the emotion of the rider 3 due to excessively-high frequency of information provision. In other words, the frequency of information provision can be sufficiently reduced when the rider 3 does not desire driving coaching.

If the emotion changes to a positive emotion due to the processing of the above-described steps SB1 to SB4, the server 31 keeps the frequency of information provision at the frequency of this timing.

Furthermore, if the driving skill has changed (step SB5), the server 31 makes change to information provision (driving coaching) matched with the driving skill after the change by making change to the instructor algorithm 45A matched with the driving skill after the change by the arithmetic unit 33 (step SB6).

Also when the travelling place of the motorcycle 2 changes between a public road and a circuit, the estimated driving skill is changed from "public road beginner level" to "circuit beginner level," for example and therefore change is made to the different instructor algorithm 45A matched with the driving skill after the change. If plural different instructor algorithms 45A exist, any one instructor algorithm 45A may be selected by using random processing or the like. By these operations, change can be made to information provision matched with the change of the travelling place.

Furthermore, if the physical condition has changed from good condition to poor condition (step SB7), the server 31 stops the information provision of driving coaching by the arithmetic unit 33 (step SB8). This is because the possibility that the rider 3 in poor physical condition does not desire driving coaching is high.

On the other hand, if the physical condition has changed from poor condition to good condition (step SB9), the server 31 starts information provision of driving coaching by the arithmetic unit 33 (step SB10). The above is the processing of the step SA7 (processing according to change).

As described above, in the present embodiment, the terminal device 10 includes the driving information acquiring unit 18 and the biological information acquiring unit 19 functioning as an information acquiring unit that acquires information relating to the emotion, the driving skill, and the physical condition of the rider (user, driver) 3. Furthermore, the arithmetic unit 33 of the server 31 functions as an estimating unit that estimates the emotion, the driving skill, and the physical condition according to acquired information and functions as an information providing unit that carries out information provision to the rider 3 according to the combination of the emotion, the driving skill, and the physical condition that are estimated. Moreover, the display unit 14, the voice input-output unit 15, and the actuator drive unit 16 of the terminal device 10 function as an information output unit that outputs information of the information providing unit.

This makes it possible to carry out information provision in consideration of whether or not the rider 3 has such emotion and physical condition as to permit the information provision of driving coaching, and so forth, and allows the information provision of appropriate driving coaching and so forth in line with the emotion and so forth of the rider 3. Therefore, opportunities to improve the skill of driving can be efficiently offered to the rider 3. Moreover, the effect of causing the rider 3 to realize fun and a sense of contentment of driving and eliminate anxiety about driving can also be expected.

Furthermore, the arithmetic unit 33 of the server 31 changes the information provision if any of the emotion, the driving skill, and the physical condition estimated from the rider 3 who is driving changes. Thus, correction to appropriate information provision in line with the change in the emotion, the driving skill, and the physical condition of the rider 3 is facilitated. This makes it easy to carry out information provision of more appropriate driving coaching and so forth in line with the rider 3.

Specifically, in the present configuration, the information providing system 1 has an automatic mode in which change is made to a dialogue-type instruction that imitates a different instructor according to change in any of the emotion, the driving skill, and the physical condition of the rider 3, and the arithmetic unit 33 changes the dialogue-type instruction in accordance with this automatic mode. However, the configuration is not limited to this configuration. A manual mode in which change is made to a dialogue-type instruction that imitates a different instructor according to selection by the rider 3 may be set, and the rider 3 may be allowed to select the automatic mode or the manual mode. In this case, the arithmetic unit 33 carries out control according to the selected mode and thereby enables instruction setting desired by the rider 3.

In addition, the arithmetic unit 33 of the server 31 reduces the frequency of information provision if the estimated emotion has changed from a positive emotion to a negative emotion. This enables responding in line with the rider 3 who feels that the frequency of information provision is too high.

Furthermore, the arithmetic unit 33 of the server 31 does not carry out information provision if the estimated physical condition is poor. This enables responding in line with the rider 3 who is not in such a physical condition as to permit the information provision.

Moreover, the arithmetic unit 33 of the server 31 executes the instructor algorithm 45A that imitates an instructor who carries out driving coaching and makes change to the instructor algorithm that imitates a different instructor according to change in the driving skill. This can carry out driving coaching by the instructor matched with the driving skill.

Furthermore, the instructor algorithm 45A outputs a dialogue-type instruction. This allows the rider 3 to get driving coaching similar to driving coaching with a dialogue with an instructor.

As described above, this information providing system 1 has the test mode in which the driving proficiency level of the rider 3 is determined. Furthermore, the configuration is so made that the rider 3 can select execution/non-execution of the test mode by using the terminal device 10. Operation when the execution of the test mode is selected will be described below.

FIG. 6 is a flowchart illustrating the operation of the server 31 when the execution of the test mode is selected. This operation may be carried out in parallel to the operation of carrying out information provision illustrated in FIG. 3 or may be carried out when the operation of carrying out information provision is not carried out. The rider 3 can select either way as appropriate.

As a premise, suppose that the rider 3 is driving the motorcycle 2 and at least information that indicates the present location of the motorcycle 2 is transmitted from the terminal device 10 to the server 31. Here, the information that indicates the present location is information included in acquired information of the surrounding information acquiring unit 18B and is information detected by the positioning unit 18C, for example.

Furthermore, the server 31 identifies the combination of the motorcycle 2 and the rider 3, the vehicle model of the motorcycle 2, and so forth based on identification information and so forth transmitted from the terminal device 10. Furthermore, the server 31 determines the driving proficiency level in association with the identified motorcycle 2.

As illustrated in FIG. 6, the server 31 monitors whether or not the motorcycle 2 travels in a prescribed specific zone by the arithmetic unit 33 based on the information that indicates the present location of the motorcycle 2 (step SC1).

The specific zone is a travelling zone in which travelling is repeatedly performed with the above-described combination of the motorcycle 2 and the rider 3 or a travelling zone that satisfies a condition set by the rider 3 in advance. For example, the specific zone is a travelling zone in which the rider 3 travels every day as a journey to work or the like, a practice course in which the rider 3 makes a driving practice, a course in a driving school, a circuit, or the like. The server 31 may continuously monitor the travelling route of the rider 3 and automatically extract the specific zone based on the monitoring result. Alternatively, the specific zone may be an area directly specified by the rider 3.

If determining that the motorcycle 2 travels in the prescribed specific zone by the arithmetic unit 33 (step SC1: YES), the server 31 starts the execution of the test mode (step SC2). Upon the start of the execution of the test mode, the arithmetic unit 33 executes the proficiency level determination algorithm 46. Furthermore, the arithmetic unit 33 makes a predetermined order to the terminal device 10 of the motorcycle 2 and thereby causes the terminal device 10 to start processing of transmitting vehicle information and information on the surroundings. Due to this, the server 31 receives the vehicle information and the information on the surroundings in real time.

Due to the execution of the emotion estimation algorithm 42 and the proficiency level determination algorithm 46 by the arithmetic unit 33, the server 31 starts estimation of the emotion and the driving skill of the rider 3 of the present timing by the arithmetic unit 33 (step SC3). The estimation result in this case is sequentially stored in a predetermined region of the storing unit 34.

The proficiency level determination algorithm 46 is an algorithm that imitates an expert who determines the driving skill and the driving proficiency level regarding the motorcycle 2. For the estimation of the driving skill, the driving skill estimation algorithm 43 may be used.

In the present embodiment, the driving skill is individual skills of accelerator operation, brake operation, gear shift operation, cornering operation, operation of other operation systems such as a turn signal, and so forth and skills regarding each of travelling situations such as crossings, straight forwarding, and curves. Furthermore, the driving proficiency level is the total evaluation based on the individual driving skills and the intervention frequency of the TCS and the ABS is also considered.

That is, while the motorcycle 2 travels in the specific zone, the driving skill regarding each of operations such as accelerator operation or the driving skill regarding each of travelling situations such as crossings is estimated and information about whether or not the TCS and the ABS have operated is accumulated in the storing unit 34 in addition to these estimation results.

Furthermore, this driving proficiency level is evaluation useful for determining whether or not the rider 3 well rides the motorcycle 2 of the driving target. For this reason, the proficiency level determination algorithm 46 also includes evaluation about whether the rider 3 is performing driving according to the category (super sports, road sports, cruiser, and so forth) of the motorcycle 2 and whether the rider 3 is performing driving according to characteristics (engine characteristics, the number of gear shift stages, allowable bank angle, and so forth) of the vehicle model of the motorcycle 2.

As above, the determination of the driving proficiency level is carried out based on various kinds of information and therefore the processing thereof tends to become enormous. In the present embodiment, due to use of artificial intelligence techniques, determination similar to that carried out by a person can be carried out efficiently.

The server 31 monitors whether or not the motorcycle 2 has gotten out of the prescribed specific zone by the arithmetic unit 33 based on the information that indicates the present location of the motorcycle 2 (step SC4).

If determining that the motorcycle 2 has gotten out of the prescribed specific zone (step SC4: YES), the server 31 determines the driving proficiency level based on the information on the emotions and the driving skills accumulated in the storing unit 34 by the arithmetic unit 33 (step SC5).

In the determination of the driving proficiency level, first the accumulated driving skills are evaluated and thereby which level (for example, beginner level, intermediate level, advanced level) the driving skill exists at is determined. The determination level thereof is referred to as a determination level LA, for example.

Next, whether or not the accumulated emotion is a positive emotion or a negative emotion is determined regarding each of the accumulated emotions.

Here, the negative emotion is fear, anxiety, anger, or the like and such an emotion readily occurs in the case in which the rider 3 has no confidence in driving or is anxious, or the like. For this reason, if a negative emotion exists, the driving proficiency level is not determined as a driving proficiency level equivalent to the above-described determination level LA but determined as a driving proficiency level equivalent to a lower determination level (hereinafter, LB) than the above-described determination level LA. On the other hand, if a negative emotion does not exist, the driving proficiency level is determined as the driving proficiency level equivalent to the above-described determination level LA.

Furthermore, also when the intervention frequency of the TCS and the ABS is higher than an allowable level defined in advance, the driving proficiency level is determined as the driving proficiency level equivalent to the determination level LB lower than the above-described determination level LA. Therefore, the driving proficiency level is determined as the driving proficiency level equivalent to the determination level LA if the driving skill is at the determination level LA and the emotion is not a negative emotion and the intervention frequency of the TCS and the ABS is equal to or lower than the allowable level.

The determination method of the driving proficiency level is not limited to the above-described method. For example, that the emotion is stable may also be employed as a condition with which it is determined that the driving proficiency level is high.

After the end of the determination of the driving proficiency level by the proficiency level determination algorithm 46, the server 31 executes processing of notifying the rider 3 of the driving proficiency level that is the determination result by the arithmetic unit 33 as information provision (step SC6).

In this case, the arithmetic unit 33 generates control information of the display unit 14 of the terminal device 10 and/or control information of the voice input-output unit 15 as notified information and transmits the control information to the terminal device 10.

By the control information of the display unit 14, information that notifies the driving proficiency level is displayed on the display unit 14. Furthermore, by the control information of the voice input-output unit 15, voice that notifies the driving proficiency level is output from the voice input-output unit 15. Thereby, the driving proficiency level is notified to the rider 3. Moreover, the information on the driving proficiency level is stored in the storing unit 13 of the terminal device 10 and the rider 3 can check the driving proficiency level at an arbitrary timing by operating the operation unit 17. After the execution of the processing of notification, the test mode is ended on the side of the server 31.

Furthermore, after the end of the test mode, the processing of the step SC1 is executed at a predetermined timing. For example, the processing of the step SC1 is executed at a timing at which a predetermined time has elapsed or a timing of the start of driving of the motorcycle 2 whose main switch is turned on again after being turned off at the end of driving of the motorcycle 2.

Due to this, the driving proficiency level is measured every time the motorcycle 2 travels in the specific zone. The rider 3 can check whether or not the driving proficiency level of oneself has been improved by checking the history of the driving proficiency level accumulated in the terminal device 10. Furthermore, the driving proficiency level is also objective evaluation information indicating that the rider 3 well rides the motorcycle 2 of the driving target. Thus, the rider 3 can get to know objective evaluation about whether or not the rider 3 well rides the motorcycle 2.

As above, in the present embodiment, the arithmetic unit 33 of the server 31 functions as a proficiency level determining unit that determines the driving proficiency level of the rider 3 based on at least the emotion and the driving skill estimated from the rider 3 who is driving. Furthermore, if at least the estimated emotion corresponds to a negative emotion although the estimated driving skill satisfies the predetermined level LA, the arithmetic unit 33 determines the driving proficiency level as one that does not reach the level LA. This can avoid the situation in which it is determined that the driving proficiency level is high although the rider 3 has no confidence in driving or is anxious, and facilitates objective evaluation of the driving proficiency level. This enables appropriate information provision in line with the rider 3.

Moreover, the driving skill is estimated based on at least any of the driving history of the rider 3, vehicle information, and environmental information on the surroundings and thus more accurate driving skill can be estimated.

Furthermore, the arithmetic unit 33 executes processing of determining the driving proficiency level of the rider 3 in association with the motorcycle 2 and notifying the rider 3 of the determination result. Thus, the rider 3 can get to know the objective driving proficiency level. This allows the rider 3 to realize a sense of achievement, a sense of contentment, and so forth of driving and, for example, makes it easy for the rider 3 to determine whether or not to step up to the next motorcycle 2, and so forth. Based on the driving proficiency level obtained in this manner, processing of driving coaching may be executed for the rider 3.

Furthermore, with the present configuration, the information providing system 1 has the test mode in which the driving proficiency level is measured and the arithmetic unit 33 automatically executes the test mode while the motorcycle 2 travels in the specific zone. Thus, the test mode can be surely executed in the specific zone. For example, because the driving proficiency level in the same specific zone can be surely measured, it becomes easy for the rider 3 to grasp whether or not the skill has been improved.

The above-described embodiment is only one mode of the present invention and modifications and applications can be arbitrarily made within such a range as not to depart from the gist of the present invention.

For example, with the flowchart illustrated in the above-described FIG. 5, the case in which the instructor algorithm 45A is changed according to change in the driving skill is described. However, the configuration is not limited thereto. For example, change may be made to the instructor algorithm 45A that imitates a different instructor according to change in any of the emotion, the driving skill, and the physical condition that are estimated.

Figure 7:
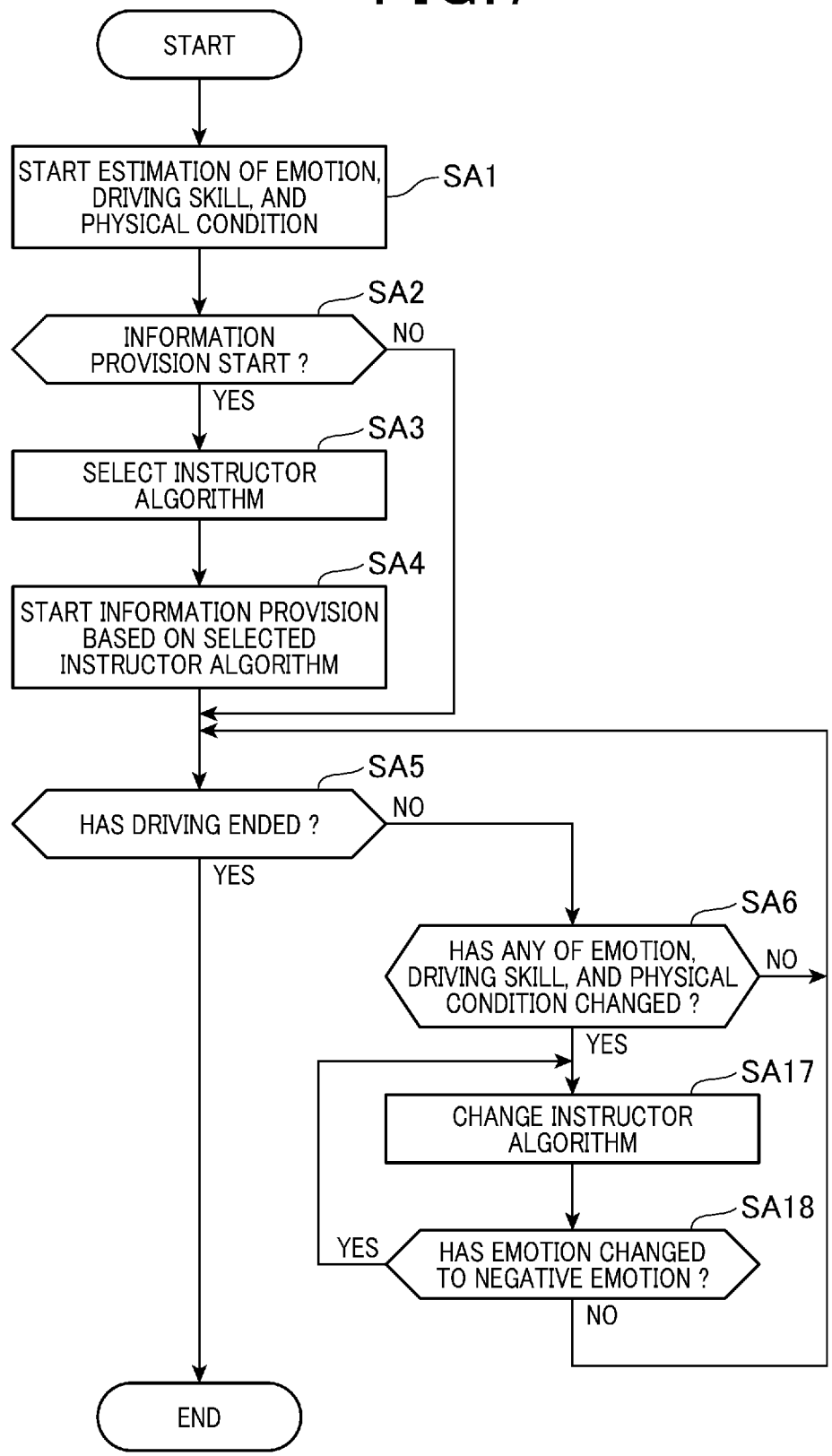
FIG. 7 is a flowchart illustrating the operation of the server according to a modification example.

FIG. 7 is a flowchart including operation of this case. The same place as the above-described embodiment is given the same step number and description thereof is omitted, and different parts will be described in detail.

As illustrated in FIG. 7, if any of the emotion, the driving skill, and the physical condition has changed (step SA6: YES), the server 31 changes the instructor algorithm 45A by the arithmetic unit 33 (step SA17).

In this step SA17, if the driving skill has changed, change is made to any instructor algorithm 45A among different instructor algorithms 45A in line with the driving skill after the change. Furthermore, if either of the emotion and the physical condition has changed, any one instructor algorithm 45A is selected among different instructor algorithms 45A matched with the driving skill by using random processing or the like.

After changing the instructor algorithm 45A, the server 31 determines whether or not the estimated emotion has changed from a positive emotion to a negative emotion by the arithmetic unit 33 (step SA18). Here, if the emotion of the rider 3 has changed to a negative emotion after the change of the instructor algorithm 45A, the possibility that the rider 3 is not satisfied with output by the instructor algorithm 45A (output of instructions) is conceivable.

Therefore, the server 31 executes the processing of the above-described step SA18 by the arithmetic unit 33 for a predetermined time continuously. If the emotion changes to a negative emotion in the predetermined time, the server 31 makes transition to the processing of the step SA17 to change the instructor algorithm 45A.

Furthermore, if the emotion of the rider 3 has not changed to a negative emotion, the server 31 makes transition to the processing of the step SA5.

If the instructor algorithm 45A is changed in this manner, by changing the instructor algorithm 45A until it is confirmed that the emotion of the rider 3 does not change to a negative emotion, change can be made to the instructor algorithm 45A with which the rider 3 is satisfied. Due also to this, opportunities to improve the skill of driving can be efficiently offered to the rider 3 and it becomes easy for the rider 3 to realize fun of driving, a sense of contentment of driving, and so forth.

Furthermore, in the above-described embodiment, a first instructor algorithm that carries out driving coaching similar to that in a driving school and a second instructor algorithm that specializes in driving coaching at a high level in a circuit may be set as the instructor algorithms 45A and the first or second instructor algorithm may be executed according to selection by the rider 3, the coaching level, or the like. For example, the first instructor algorithm carries out information provision for driving coaching of items tested in the driving school, such as figure-of-eight running and straight narrow line driving. This allows appropriate information provision for the rider 3 who desires driving coaching of the driving school.

Moreover, for example, the second instructor algorithm carries out information provision for driving coaching for driving of a professional rider. This allows appropriate information provision for the rider 3 who aims at circuit running at a high level.

In addition, with the flowchart illustrated in the above-described FIG. 6, the case in which estimation of the physical condition is not carried out is described. However, the physical condition may be estimated, and execution of the test mode may be suspended if the estimated physical condition is poor and execution of the test mode may be permitted if the physical condition is good.

Furthermore, in the above-described embodiment, the case is described in which biological information of the rider 3, vehicle information, and information on the surroundings are acquired as pieces of information relating to the emotion, the driving skill, and the physical condition of the rider and the emotion, the driving skill, and the physical condition are estimated based on these pieces of information. However, the configuration is not limited thereto. If there is information with which the emotion, the driving skill, and the physical condition can be estimated other than the above-described pieces of information, the information may be used. In addition, part or the like of any of the above-described biological information, vehicle information, and information on the surroundings may be omitted as long as the emotion, the driving skill, and the physical condition can be estimated.

Moreover, in the above-described embodiment, the personality of the rider 3 may be estimated by using at least any of the biological information of the rider 3, the vehicle information, and the information on the surroundings and the instructor algorithm 45A may be selected in consideration of the estimated personality. For example, it is conceivable that the instructor algorithm 45A that imitates an instructor having a character that matches the estimated personality is selected when any instructor algorithm 45A is selected among plural instructor algorithms 45A corresponding to the estimated driving skill.

Regarding the estimation of the personality, the estimation can be carried out based on whether or not the rider 3 is performing driving with frequent sudden acceleration and sudden deceleration based on accelerator operation and brake operation, the surrounding situation of the sudden acceleration and sudden deceleration, the vehicle speed, and so forth, for example. In addition, by using artificial intelligence techniques for this estimation of the personality, personality estimation similar to that carried out by a person is enabled efficiently.

Furthermore, in the above-described embodiment, personal information of the rider 3 may be acquired in advance and the instructor algorithm 45A may be selected in consideration of the personal information. For example, it is conceivable that the instructor algorithm 45A that imitates an instructor with age and sex close to those included in the personal information of the rider 3 is selected when any instructor algorithm 45A is selected among plural instructor algorithms 45A corresponding to the estimated driving skill.

Moreover, either of the estimated personality and the personal information acquired in advance may be reflected in the contents of driving coaching offered to the rider 3. For example, the instructor algorithm 45A may have a function of changing the contents of driving coaching in line with the personality or the personal information. This allows driving coaching matched with the rider 3 at a higher degree.

In addition, in the above-described embodiment, information provided by the instructor algorithm 45A or the proficiency level determination algorithm 46 can be changed as appropriate. For example, also in the instructor algorithm 45A, the driving proficiency level may be determined and notified to the rider 3. Furthermore, information on the next step-up may be notified to the rider 3. The information on the next step-up is a proposal for circuit running, a proposal for the motorcycle 2 of another type, and so forth.

Furthermore, in the above-described embodiment, the case is described in which the frequency of information provision is reduced if the estimated emotion changes from a positive emotion to a negative emotion. However, the configuration is not limited thereto. For example, in addition to the frequency reduction mode, which is the operation state in which the frequency of information provision is reduced, or instead of the frequency reduction mode, a cheering/concern mode in which cheering or concern for promoting a favorable turn of the emotion of the user is carried out by voice, displaying, or the like may be set. Moreover, the cheering/concern mode may be carried out in the steps SB4 and SB8 illustrated in FIG. 5, and the cheering/concern mode may be carried out if the step SB9 illustrated in FIG. 5 yields the negative result (if the physical condition has not changed to good condition).

Furthermore, in the above-described embodiment, the case in which the terminal device 10 is mounted on the motorcycle 2 is described. However, the terminal device 10 may be a device that can be carried from the motorcycle 2, specifically e.g. a wearable device carried by the rider 3.

Moreover, in the above-described embodiment, the case in which the information providing system 1 is composed of the terminal device 10 and the server 31 is described. However, the configuration is not limited thereto. For example, the information providing system 1 may be formed of one hardware device that implements the above-described respective functions and a device equivalent to the server 31 may be formed of plural computers.

In addition, in the above-described embodiment, the case of the motorcycle 2 is described as one example of the vehicle. However, the configuration is not limited thereto and various vehicles such as scooter-type vehicles, saddle-type vehicles such as three-wheeled vehicles and four-wheeled vehicles such as ATV, cars, and bicycles can be applied to the present invention.

DESCRIPTION OF REFERENCE SYMBOLS 1 information providing system
2, 2A to 2C Motorcycle
3, 3A to 3C Rider (user)
10 Terminal device
11, 32 Communication unit
12 Control unit
13, 34 Storing unit
14 Display unit (information output unit)
15 Voice input-output unit (information output unit)
16 Actuator drive unit (information output unit)
17 Operation unit
18 Driving information acquiring unit (information acquiring unit)
19 Biological information acquiring unit (information acquiring unit)
21 Communication network
31 Server
33 Arithmetic unit (information providing unit)
D1 to D5 First to fifth vehicle information

The invention claimed is:

1. An information providing system comprising:
a first processor, a second processor, and a memory, wherein
the first processor is configured to operate as:
a driving information acquiring unit that includes multiple sensors, and acquires vehicle information indicating status of respective parts of a vehicle and surrounding information indicating surrounding situation of the vehicle; and
a biological information acquiring unit which includes a biological sensor and acquires biological information relating to a physical condition of a user who is driving the vehicle,
the second processor is configured to operate as:
an arithmetic unit that estimates an emotion, a driving skill, and a physical condition of the user according to the vehicle information, the surrounding information, and the biological information that are acquired by the driving information acquiring unit and the biological information acquiring unit using algorithms that are stored in the memory,
wherein the arithmetic unit carries out information provision of a driving coaching relating to a coaching of driving operations including an accelerator operation, a gear shift operation, and a brake operation with a provision way according to a combination of the emotion, the driving skill, and the physical condition that are estimated,
wherein the arithmetic unit is configured to determine a driving proficiency level of the user based on at least the emotion and the driving skill that are estimated from the user who is driving, and
wherein the arithmetic unit determines the driving proficiency level as the driving skill of the user failing to reach a predetermined level when the estimated emotion of the user corresponds to the negative emotion even though the estimated driving skill satisfies the predetermined level.

2. The information providing system according to claim 1, wherein the arithmetic unit changes the provision way of information relating to the driving coaching when any of the emotion, the driving skill, and the physical condition that are estimated from the user who is driving changes.

3. The information providing system according to claim 2, wherein the arithmetic unit estimates whether the emotion of the user is a negative emotion that includes the emotion with fear, anxiety, anger, or disgust and that is an emotion with a tendency toward rejection of the driving coaching, or a positive emotion that includes the emotion with delight, fun, or a feeling of happiness and that is an emotion with a tendency toward permission of the driving coaching,
 wherein the provision way of information relating to the driving coaching includes frequency of the information provision, and
 wherein the arithmetic unit reduces frequency of the information provision when the estimated emotion of the user changes from the positive emotion to the negative emotion.

4. The information providing system according to claim 2, wherein the provision way of information relating to the driving coaching includes whether or not to start the information provision, and
 wherein the arithmetic unit providing unit does not carry out the information provision when the estimated physical condition of the user is not in a condition to permit the information provision.

5. The information providing system according to claim 1, wherein
 the information provision includes a dialogue-type instruction that imitates an instructor who carries out driving coaching, and
 the arithmetic unit changes a dialogue-type instruction that imitates a different instructor according to change in any of the emotion, the driving skill, and the physical condition of the user that are estimated.

6. The information providing system according to claim 5, wherein
 the information providing system has an automatic mode in which change is made to a dialogue-type instruction that imitates a different instructor according to change in any of the emotion, the driving skill, and the physical condition of the user that are estimated and a manual mode in which change is made to a dialogue-type instruction that imitates a different instructor according to selection by the user, and
 the arithmetic unit carries out control according to a selected mode.

7. The information providing system according to claim 1, wherein the arithmetic unit estimates the driving skill of the user based on at least any of a driving history of the user that is stored in the memory, and vehicle information and surrounding information indicating surrounding situation of the vehicle acquired by the driving information acquiring unit.

8. An information providing system comprising:
 a first processor, a second processor, and a memory, wherein
 the first processor is configured to operate as:
  a driving information acquiring unit that includes multiple sensors and acquires vehicle information indicating status of respective parts of a vehicle, and surrounding information indicating surrounding situation of the vehicle; and
  a biological information acquiring unit that includes a biological sensor and acquires biological information relating to a physical condition of a user who is driving the vehicle,
 the second processor is configured to operate as:
  an arithmetic unit that estimates an emotion, a driving skill, and a physical condition of the user according to the vehicle information, the surrounding information, and the biological information that are acquired by the driving information acquiring unit and the biological information acquiring unit using algorithms that are stored in the memory,
 wherein the arithmetic unit is configured to determine a driving proficiency level of the user based on at least the emotion and the driving skill of the user that are estimated from the user who is driving, and
 wherein the arithmetic unit determines the driving proficiency level as the driving skill failing to reach a predetermined level when at least the estimated emotion of the user corresponds to a negative emotion that includes the emotion with fear, anxiety, anger, or disgust and that is the emotion with a tendency toward rejection of the driving coaching even though the driving skill of the user estimated satisfies the predetermined level.

9. The information providing system according to claim 8, wherein the arithmetic unit executes processing of determining the driving proficiency level of the user in association with the vehicle and notifying the user of a determination result.

10. The information providing system according to claim 8, wherein
 the arithmetic unit automatically executes a test mode in which the driving proficiency level is measured when the arithmetic unit determines based on the information acquired by the driving information acquiring unit that the vehicle is traveling in a specific zone and while the vehicle is traveling in the specific zone.

11. An information providing system comprising:
 a terminal device mounted on a vehicle, the terminal device comprising:
  a first processor, wherein the first processor is configured to operate as:
   a driving information acquiring unit that includes multiple sensors, and acquires vehicle information indicating status of respective parts of the vehicle and surrounding information indicating surrounding situation of the vehicle, wherein the vehicle information indicates at least one of an accelerator operation, a brake operation, a gear shift operation, a cornering operation or a turn signal operation, and the surrounding information indicates at least one of a road situation, signs, vehicles and persons in the surroundings or the ambient temperature; and
   a biological information acquiring unit which includes a biological sensor and acquires biological information relating to a physical condition of a user who is driving the vehicle, wherein the biological information indicates at least one of a pulse rate, a bold pressure, a facial expression or an amount of perspiration; and
  an output system including a display, a voice control and a physical motion actuator; and
 a server communicating with the terminal device through a communication network and configured to carry out an information provision to promote improvement on driving of the vehicle, the server comprising a second processor and a memory, wherein the second processor is configured to operate as:

an arithmetic unit that estimates an emotion, a driving skill, and a physical condition of the user according to the vehicle information, the surrounding information, and the biological information that are acquired by the driving information acquiring unit and the biological information acquiring unit using algorithms that are stored in the memory, wherein the arithmetic unit is configured to generate information on a driving coaching based on the vehicle information, the surrounding information, and the biological information that are continuously transmitted from the driving information acquiring unit and the biological information acquiring unit, wherein the server is configured to communicate with the output system of the terminal device and output the generated information on the driving coaching to the display, the voice control and the physical motion actuator, causing the display to display the information on the driving coaching to the user in real time, causing the voice control to generate a voice signal instructing the user with the information on the driving coaching in real time, and causing the physical motion actuator to generate a physical motion indicating the information on the driving coaching to the user in real time, wherein the arithmetic unit is configured to determine a driving proficiency level of the user based on at least the emotion and the driving skill that are estimated from the user who is driving, and wherein the arithmetic unit determines the driving proficiency level as the driving skill of the user failing to reach a predetermined level when the estimated emotion of the user corresponds to the negative emotion even though the estimated driving skill satisfies the predetermined level.

* * * * *